United States Patent
Ray et al.

(10) Patent No.: US 8,606,218 B2
(45) Date of Patent: *Dec. 10, 2013

(54) SYSTEM AND METHOD FOR HANDLING EMERGENCY IMAGE MESSAGING

(75) Inventors: Amar Nath Ray, Shawnee, KS (US); Carl M. Coppage, Kansas City, MO (US); Lynn T. Greene, Olathe, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 991 days.

This patent is subject to a terminal disclaimer.

(21) Appl. No.: 12/257,736

(22) Filed: Oct. 24, 2008

(65) Prior Publication Data

US 2010/0003953 A1    Jan. 7, 2010

Related U.S. Application Data

(60) Provisional application No. 61/078,123, filed on Jul. 3, 2008.

(51) Int. Cl.
*H04W 4/00* (2009.01)
(52) U.S. Cl.
USPC .................. 455/404.1; 455/404.2; 455/466
(58) Field of Classification Search
USPC .................. 455/404.1, 404.2, 456.1–457; 379/37–51; 340/287–309
See application file for complete search history.

(56) References Cited

U.S. PATENT DOCUMENTS

| | | | |
|---|---|---|---|
| 5,339,351 A | 8/1994 | Hoskinson et al. | |
| 5,379,337 A | 1/1995 | Castillo et al. | |
| 5,497,149 A | 3/1996 | Fast | |
| 5,555,286 A | 9/1996 | Tendler | |
| 5,646,987 A | 7/1997 | Gerber et al. | |
| 5,710,803 A | 1/1998 | Kowal et al. | |
| 5,936,622 A | 8/1999 | Halverson et al. | |
| 5,941,930 A | 8/1999 | Morimoto et al. | |
| 6,240,285 B1 | 5/2001 | Blum et al. | |
| 6,317,049 B1 | 11/2001 | Toubia et al. | |
| 6,366,772 B1 | 4/2002 | Arnson | |
| 6,377,169 B1 | 4/2002 | Yanagisawa | |
| 6,405,033 B1 | 6/2002 | Kennedy et al. | |
| 6,415,018 B1 | 7/2002 | Antonucci et al. | |
| 6,424,908 B2 | 7/2002 | Urban et al. | |

(Continued)

OTHER PUBLICATIONS

Dale N. Hatfield, "A Report on Technical and Operational Issues Impacting the Provision of Wireless Enhanced 911 Services," Federal Communications Commission, printed from the World Wide Web on May 8, 2006 (54 pages).

(Continued)

*Primary Examiner* — Allahyar Kasraian
(74) *Attorney, Agent, or Firm* — Swanson & Bratschun, L.L.C.

(57) ABSTRACT

A system and method for routing emergency image messages to a PSAP may include receiving an emergency data message and identifying that the emergency data message includes an image. A location of a wireless communications device used to send the emergency data message may be determined. At least one PSAP local to the emergency communications device may be identified and a determination as to which, if any, of the at least one PSAP is capable of receiving an emergency data message that includes an image may be made. The emergency data message that includes an image may be routed to a PSAP local to the wireless communications device and capable of receiving emergency data messages that include an image.

20 Claims, 6 Drawing Sheets

(56) References Cited

U.S. PATENT DOCUMENTS

| | | | |
|---|---|---|---|
| 6,456,695 B2 | 9/2002 | Lee | |
| 6,480,578 B1 | 11/2002 | Allport | |
| 6,526,125 B1 | 2/2003 | Lindsay et al. | |
| 6,631,184 B1 | 10/2003 | Weiner | |
| 6,636,732 B1 | 10/2003 | Boling et al. | |
| 6,690,932 B1 | 2/2004 | Barnier et al. | |
| 7,026,925 B2 | 4/2006 | Roche et al. | |
| 7,079,627 B2 | 7/2006 | Crago et al. | |
| 7,095,733 B1 | 8/2006 | Yarlgadda et al. | |
| 7,231,218 B2 | 6/2007 | Diacakis et al. | |
| 7,269,413 B2 | 9/2007 | Kraft | |
| 7,391,784 B1 | 6/2008 | Renkel | |
| 7,418,087 B2 | 8/2008 | Luneau et al. | |
| 7,444,238 B1 | 10/2008 | Opitz | |
| 7,496,189 B2 | 2/2009 | Clarisse et al. | |
| 7,679,505 B1 | 3/2010 | Vallaire | |
| 7,706,356 B1 | 4/2010 | Olshansky et al. | |
| 7,734,019 B1 | 6/2010 | Terpstra | |
| 7,751,534 B2 * | 7/2010 | Sun | 379/88.13 |
| 8,364,117 B2 | 1/2013 | Hawkins | |
| 8,428,548 B2 | 4/2013 | Ray et al. | |
| 8,472,916 B2 | 6/2013 | Coppage et al. | |
| 8,521,121 B2 | 8/2013 | Ray et al. | |
| 8,538,370 B2 | 9/2013 | Ray et al. | |
| 8,548,421 | 10/2013 | Ray et al. | |
| 2001/0003843 A1 | 6/2001 | Scepanovic et al. | |
| 2001/0004588 A1 | 6/2001 | Hong | |
| 2001/0012379 A1 | 8/2001 | Amemiya et al. | |
| 2002/0016189 A1 | 2/2002 | Sheynblat et al. | |
| 2002/0068584 A1 | 6/2002 | Gage et al. | |
| 2002/0136363 A1 | 9/2002 | Stumer et al. | |
| 2003/0063714 A1 | 4/2003 | Stumer et al. | |
| 2003/0109245 A1 | 6/2003 | McCalmont et al. | |
| 2003/0122779 A1 | 7/2003 | Martin et al. | |
| 2003/0133450 A1 | 7/2003 | Baum | |
| 2003/0162554 A1 | 8/2003 | Kim | |
| 2004/0029610 A1 | 2/2004 | Ihira et al. | |
| 2004/0056770 A1 | 3/2004 | Metcalf | |
| 2004/0063439 A1 | 4/2004 | Glazko et al. | |
| 2004/0072583 A1 | 4/2004 | Weng | |
| 2004/0113836 A1 | 6/2004 | Rickerson, Jr. | |
| 2004/0157564 A1 | 8/2004 | Murakami et al. | |
| 2004/0176123 A1 | 9/2004 | Chin et al. | |
| 2004/0185871 A1 | 9/2004 | Somani et al. | |
| 2004/0198329 A1 | 10/2004 | Vasa | |
| 2004/0258216 A1 | 12/2004 | Reid | |
| 2005/0003797 A1 | 1/2005 | Baldwin | |
| 2005/0048947 A1 * | 3/2005 | Holland et al. | 455/404.1 |
| 2005/0070315 A1 | 3/2005 | Rai et al. | |
| 2005/0085257 A1 | 4/2005 | Laird et al. | |
| 2005/0090225 A1 | 4/2005 | Muehleisen et al. | |
| 2005/0097380 A1 | 5/2005 | Kim | |
| 2005/0101287 A1 | 5/2005 | Jin et al. | |
| 2005/0111630 A1 | 5/2005 | Potorny et al. | |
| 2005/0169248 A1 | 8/2005 | Truesdale et al. | |
| 2005/0197096 A1 | 9/2005 | Yang et al. | |
| 2005/0201358 A1 * | 9/2005 | Nelson et al. | 370/352 |
| 2005/0209781 A1 | 9/2005 | Anderson | |
| 2005/0239477 A1 | 10/2005 | Kim et al. | |
| 2005/0265326 A1 | 12/2005 | Laliberte | |
| 2005/0277405 A1 | 12/2005 | Noguchi | |
| 2006/0009243 A1 | 1/2006 | Dahan et al. | |
| 2006/0052134 A1 | 3/2006 | Sato | |
| 2006/0056620 A1 | 3/2006 | Shingal et al. | |
| 2006/0133582 A1 | 6/2006 | McCulloch | |
| 2006/0145841 A1 | 7/2006 | Daurensan et al. | |
| 2006/0152373 A1 | 7/2006 | King | |
| 2006/0166685 A1 | 7/2006 | Adkins | |
| 2006/0217105 A1 | 9/2006 | Kumar P S et al. | |
| 2006/0217136 A1 | 9/2006 | Bantukul et al. | |
| 2006/0219542 A1 | 10/2006 | Savir | |
| 2006/0222151 A1 | 10/2006 | Goldman et al. | |
| 2006/0227122 A1 | 10/2006 | Proctor | |
| 2006/0229100 A1 | 10/2006 | Born | |
| 2006/0238384 A1 | 10/2006 | Hess et al. | |
| 2006/0276168 A1 | 12/2006 | Fuller et al. | |
| 2006/0293024 A1 | 12/2006 | Benco et al. | |
| 2007/0001902 A1 | 1/2007 | Kuo et al. | |
| 2007/0003024 A1 | 1/2007 | Olivier et al. | |
| 2007/0082652 A1 | 4/2007 | Hartigan et al. | |
| 2007/0201391 A1 | 8/2007 | Belmonte et al. | |
| 2007/0201645 A1 | 8/2007 | Gass et al. | |
| 2007/0273519 A1 | 11/2007 | Ichikawa et al. | |
| 2007/0280428 A1 | 12/2007 | McClelland | |
| 2007/0287473 A1 | 12/2007 | Dupray | |
| 2008/0001734 A1 | 1/2008 | Stilp et al. | |
| 2008/0013696 A1 | 1/2008 | Motley et al. | |
| 2008/0057944 A1 | 3/2008 | Miriyala et al. | |
| 2008/0057987 A1 | 3/2008 | Landschaft et al. | |
| 2008/0064363 A1 | 3/2008 | Salafia et al. | |
| 2008/0070553 A1 | 3/2008 | Yamakawa et al. | |
| 2008/0122929 A1 * | 5/2008 | Chukwu | 348/143 |
| 2008/0220715 A1 | 9/2008 | Sinha et al. | |
| 2008/0227427 A1 | 9/2008 | Kadavallur et al. | |
| 2008/0254810 A1 | 10/2008 | Fok et al. | |
| 2008/0273670 A1 * | 11/2008 | Dickinson | 379/45 |
| 2008/0275950 A1 | 11/2008 | Jordan | |
| 2008/0287748 A1 | 11/2008 | Sapounas et al. | |
| 2008/0310850 A1 | 12/2008 | Pederson et al. | |
| 2009/0047924 A1 | 2/2009 | Ray et al. | |
| 2009/0064039 A1 | 3/2009 | Lee et al. | |
| 2009/0121930 A1 | 5/2009 | Bennett et al. | |
| 2009/0131072 A1 | 5/2009 | Razdan et al. | |
| 2009/0144157 A1 | 6/2009 | Saracino et al. | |
| 2009/0149153 A1 | 6/2009 | Lee | |
| 2009/0186596 A1 * | 7/2009 | Kaltsukis | 455/404.2 |
| 2009/0197567 A1 | 8/2009 | Ogram | |
| 2009/0215428 A1 | 8/2009 | Noldus et al. | |
| 2009/0227225 A1 | 9/2009 | Mitchell et al. | |
| 2009/0233573 A1 | 9/2009 | Gray | |
| 2009/0310602 A1 | 12/2009 | Olshansky et al. | |
| 2010/0098062 A1 | 4/2010 | Croak et al. | |
| 2010/0291894 A1 | 11/2010 | Pipes | |
| 2013/0115909 A1 | 5/2013 | Hawkins | |

OTHER PUBLICATIONS

ANSI, "TIA Standard Telecommunications Telephone Terminal Equipment Caller Identity and Visual Message Waiting Indicator Equipment Performance Requirements," TIA-777-A, Revision of TIA/EIA-777, May 1, 2003 (77 pages).

Micro Engineering Labs, Inc., "Caller ID", Retrieved from the Internet at URL: <http://www.melabs.com/resources/callerid.htm> on Apr. 24, 2006; Copyright 2006 by microEngineering Labs, Inc (as of date of retrieval, article last updated Apr. 16, 2006) (3 pages).

Dave Ryan & Asher Hazanchuk, "On-Hook & Off-Hook Caller ID Using DSP," Circuit Cellular INK # 83, Jun. 1997 (12 pages).

Ittiam Systems, "Caller Identification (CLI or Caller ID)," Retrieved from the Internet on Apr. 24, 2006 at URL <http://www.ittiam.com/pages/products/cid.htm, downloaded from the World Wide Web on Apr. 24, 2006 (2 pages).

"AT & T Wireless Unleashes the First and Only Wireless Messaging Device", PhysOrg.com, Sep. 30, 2004; available online at URL: <http://www.physorg.com/news1392.html> (12 pages).

Non-Final Office Action date mailed Aug. 3, 2010 for U.S. Appl. No. 11/891,784.

Response filed Nov. 2, 2010 for U.S. Appl. No. 11/891,784.

Non-Final Rejection mailed Jan. 19, 2011 for U.S. Appl. No. 11/430,232.

Non-Final Rejection mailed Mar. 17, 2011 for U.S. Appl. No. 11/640,714.

RCE filed on Apr. 4, 2011 for U.S. Appl. No. 11/891,784.

Final Rejection mailed Jan. 3, 2011 for U.S. Appl. No. 11/891,784.

Non-Final Rejection mailed Mar. 4, 2011 for U.S. Appl. No. 12/257,424.

"NENA Recommended Generic Standards for E9-1-1 PSAP Equipment" NENA Technical Reference. NENA-04-001 Issue 2, Mar. 2001.

Non-Final Rejection mailed Mar. 28, 2011 for U.S. Appl. No. 11/430,232.

(56) References Cited

OTHER PUBLICATIONS

Non-Final Rejection mailed Apr. 1, 2011 for U.S. Appl. No. 12/257,655.
Non-Final Rejection mailed Mar. 3, 2011 for U.S. Appl. No. 12/257,416.
Non-Final Rejection mailed Mar. 17, 2011 for U.S. Appl. No. 12/257,640.
U.S. Appl. No. 12/070,775; Issue Notification dated Jan. 9, 2013; 1 page.
U.S. Appl. No. 12/257,640; Non-Final Rejection dated Dec. 5, 2012; 23 pages.
U.S. Appl. No. 12/257,655; Final Rejection dated Jan. 2, 2013; 18 pages.
U.S. Appl. No. 12/257,687; Notice of Allowance dated Feb. 20, 2013; 20 pages.
U.S. Appl. No. 12/257,687; Notice of Panel Decision on Pre-Appeal Brief Review dated Dec. 14, 2012; 2 pages.
U.S. Appl. No. 12/257,717; Notice of Allowance dated Feb. 14, 2013: 35 pages.
U.S. Appl. No. 12/257,725; Notice of Allowance dated Dec. 24, 2012; 24 pages.
U.S. Appl. No. 12/070,775; Notice of Allowance dated Sep. 12, 2012; 24 pages.
U.S. Appl. No. 12/257,674; Final Rejection dated Nov. 5, 2012; 17 pages.
U.S. Appl. No. 12/257,687; Final Rejection dated Aug. 31, 2012; 19 pages.
U.S. Appl. No. 12/257,717; Non-Final Rejection dated Aug. 16, 2012; 42 pages.
U.S. Appl. No. 12/257,836; Non-Final Rejection dated Sep. 12, 2012; 25 pages.
U.S. Appl. No. 12/257,674; Notice of Allowance dated Jan. 25, 2012; 7 pages.
U.S. Appl. No. 12/257,674; Final Rejection dated Oct. 3, 2011; 15 pages.
U.S. Appl. No. 12/257,674 Non-Final Rejection dated Apr. 28, 2011; 14 pages.
U.S. Appl. No. 12/257,717; Final Rejection dated Jan. 23, 2012; 16 pages.
U.S. Appl. No. 12/257,717; Non-Final Rejection dated Sep. 13, 2011; 14 pages.
U.S. Appl. No. 12/257,725; Final Rejection dated Jan. 17, 2012; 17 pages.
U.S. Appl. No. 12/257,725; Non-Final Rejection dated Jul. 19, 2011; 26 pages.
U.S. Appl. No. 12/257,640; Non-Final Rejection dated Jan. 4, 2012; 19 pages.
U.S. Appl. No. 12/257,640; Final Rejection dated Aug. 17, 2011; 11 pages.
U.S. Appl. No. 12/257,655; Final Rejection dated Sep. 16, 2011; 20 pages.
U.S. Appl. No. 12/257,655; Amendment and Request for Continued Examination dated Dec. 16, 2011; 14 pages.
U.S. Appl. No. 12/070,775; Non-Final Rejection dated Jul. 25, 2011; 33 pages.
U.S. Appl. No. 12/257,836 Non-Final Rejection dated Nov. 29, 2011; 13 pages.
U.S. Appl. No. 12/257,836; Non-Final Rejection dated Jun. 8, 2011; 15 pages.
U.S. Appl. No. 12/257,687; Non-Final Rejection dated Apr. 9, 2012; 16 pages.
U.S. Appl. No. 12/257,687; Non-Final Rejection dated May 10, 2011; 14 pages.
U.S. Appl. No. 12/257,687; Final Rejection dated Sep. 29, 2011; 12 pages.
U.S. Appl. No. 12/257,416; Final Rejection dated Jul. 14, 2011; 17 pages.
U.S. Appl. No. 12/070,775; Final Rejection dated May 14, 2012; 27 pages.
U.S. Appl. No. 12/257,416; Final Rejection dated Jun. 13, 2012; 38 pages.
U.S. Appl. No. 12/257,640; Final Rejection dated May 2, 2012; 18 pages.
U.S. Appl. No. 12/257,655; Non-Final Rejection dated Jul. 17, 2012; 26 pages.
U.S. Appl. No. 12/257,674; Non-Final Rejection dated Jul. 20, 2012; 21 pages.
U.S. Appl. No. 12/257,836; Final Rejection dated May 14, 2012; 26 pages.
U.S. Appl. No. 12/257,836; Notice of Allowance dated Mar. 12, 2013; 31 pages.
U.S. Appl. No. 13/712,669; Non-Final Rejection dated Mar. 27, 2013; 34 pages.
U.S. Appl. No. 12/257,674; Notice of Allowance dated Apr. 3, 2013; 15 pages.
U.S. Appl. No. 12/257,725; Issue Notification dated Apr. 3, 2013; 1 page.
U.S. Appl. No. 12/257,640; Final Rejection dated Apr. 15, 2013; 21 pages.
U.S. Appl. No. 12/257,655; Notice of Allowance dated Apr. 16, 2013; 15 pages.
U.S. Appl. No. 12/257,416; Non Final Office Action dated May 22, 2013; 40 pages.
U.S. Appl. No. 12/257,687; Issue Notification dated Jun. 5, 2013; 1 page.
U.S. Appl. No. 12/257,717; Issue Notification dated Aug. 7, 2013; 1 page.
U.S. Appl. No. 12/257,640; Notice of Allowance dated Aug. 28, 2013; 14 pages.
U.S. Appl. No. 12/257,674; Issue Notification dated Aug. 28, 2013; 2 pages.
U.S. Appl. No. 12/257,655; Issue Notification dated Sep. 11, 2013; 1 page.
U.S. Appl. No. 12/257,416; Final Rejection dated Sep. 17, 2013; 41 pages.
U.S. Appl. No. 13/712,669; Final Rejection dated Oct. 18, 2013; 22 pages.

* cited by examiner

US 8,606,218 B2

SYSTEM AND METHOD FOR HANDLING EMERGENCY IMAGE MESSAGING

CROSS REFERENCE TO RELATED APPLICATIONS

This Application claims priority to Provisional Patent Application Ser. No. 61/078,123 filed on Jul. 3, 2008; the entire teachings of which are incorporated herein by reference.

BACKGROUND OF THE INVENTION

Emergency 911 services have traditionally been performed by a user placing a telephone call to "911." Prior to mobile communications developing, users would dial "911" on landlines, and the public switched telephone network (PSTN) would route the call to a public safety answering point (PSAP) local to a street address of the landline telephone used to place the call.

With mobile and wireless telephones, the address of a user in an emergency call is unknown. To determine the address or location of the caller, various techniques for determining geographic positioning of the caller are performed, including using global positioning system (GPS) equipment and network assisted positioning by using triangulation, as performed by a communications network. The communications network identifies the emergency "911" call and, based on the location of the caller, routes the call to a local PSAP with respect to the location of the caller. Depending on the technology used by the PSAP, geographic coordinates may be sent to the PSAP. If the PSAP is configured with enhanced "911" or E-911 Phase II, then a local automatic location identification (ALI) database may be used to convert the geographic coordinates to address-based coordinates.

As mobile telecommunications have advanced, different forms of data messaging communications have been developed, including text messaging, instant messaging, photo messaging, and video messaging. To accommodate these new forms of communications, a few PSAPs have advertised specific telephone numbers that users can text message, for example, to notify emergency services of an emergency. The problem is that unless a user has saved the emergency telephone number in his or her mobile device, the user is unlikely to remember the telephone number or not have time to enter the telephone number during an emergency situation. Furthermore, if the user has traveled any sufficient distance from a PSAP that has a specific telephone for sending text messages, then the PSAP is no longer local to the user.

SUMMARY

To overcome the problem of users not being able to send emergency data messages that include images to a common, easy to remember network address that will be routed to a PSAP local to a user, the principles of the present invention provide for a system configured to determine a PSAP local to the user and capable of receiving images. The system may be a centralized or distributed system associated with a network address.

A system and method for routing emergency image messages to a PSAP may include receiving an emergency data message and identifying that the emergency data message includes an image. A location of a wireless communications device used to send the emergency data message may be determined. At least one PSAP local to the emergency communications device may be identified and a determination as to which, if any, of the at least one PSAP is capable of receiving an emergency data message that includes an image may be made. The emergency data message that includes an image may be routed to a PSAP local to the wireless communications device and capable of receiving emergency data messages that include an image.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 1:
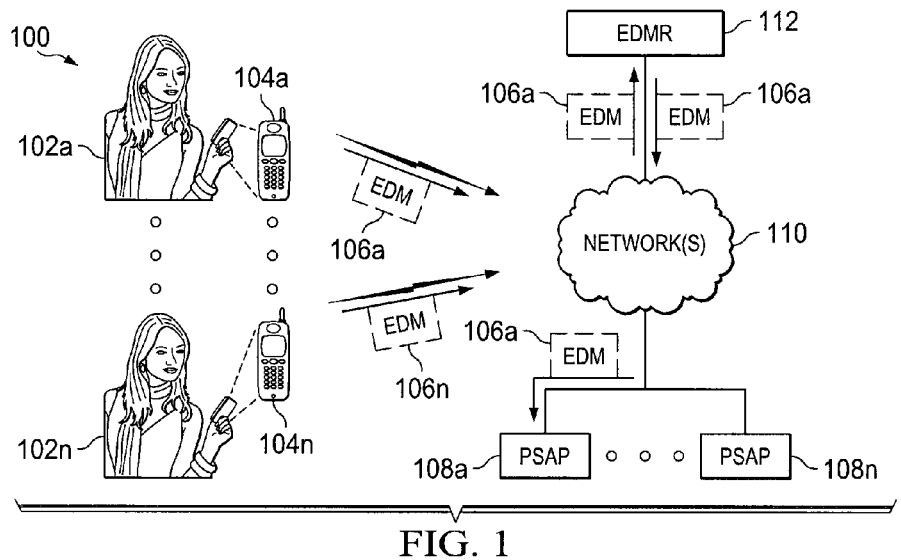
FIG. 1 is an illustration of illustrative network environment in which users of wireless communications devices are able to send emergency data messages via an emergency data message router to local public safety answering points.

With regard to FIG. 1, a network environment 100 provides users 102a-102n (collectively 102) of wireless communications devices 104a-104n (collectively 104), which may be mobile telephones, personal digital assistants (PDAs), wireless electronic games, multi-mode telephones, or other electronic devices capable of communicating emergency data messages (EDM) 106a-106n (collectively 106) to public safety answering points (PSAPs) 108a-108n (collectively 108). Emergency data messages may include text messages, instant messages (IMs), emails, photo messages, video messages, and the like. The emergency data messages 106 may be communicated to an emergency network address, such as "emergency.org," "911.911," or any other network address, by users 102 from the wireless communications devices 104 activating a single emergency data message button, either a hard-button or a soft-button, that causes the wireless communications devices 104 to generate a pre-established or pre-formatted data message. A preestablished or pre-formatted data message, such as a text message, may include information associated with a respective user, such as the user's name, telephone number, home or work address, secondary contact number, or any other information associated with a user such that an operator at a PSAP or emergency personnel (e.g., police) may have information of the user if he or she is unable to be immediately located. Alternatively, a "free-form" data message, such as a text message, may be sent to an emergency network address, but the user may run the risk of being incomplete or too "cryptic" due to being in an emergency situation or using abbreviations unfamiliar to PSAP operators. The emergency data message may be communicated via the network(s) 110 to a PSAP local to the respective user.

The networks 110 may include mobile networks, wireless communications networks, Internet, public switched telephone network (PSTN), or any other network capable of communicating an emergency data message to the PSAPs 108. As shown, an emergency data message 106a is communicated from the wireless communications device 104a via the network(s) 110 to an emergency data message router (EDMR) 112, which may be located at an emergency message address that is configured to determine a PSAP 108a that services a geographic area in which the user 102a is currently located. The emergency data message router 112 may be a centralized router associated with an address to which the emergency data messages 106 are communicated or may be configured as distributed routers that handle incoming emergency data messages from respective regions of the country. The emergency data message router 112 may receive data communicated with an emergency data message that may be used to identify a geographic location, geographic area, cell site, or otherwise, as further described herein. In addition, the emergency data message router 112 may determine which of the PSAPs local to a user sending an emergency data message has communications capabilities for handling the type of emergency data message (e.g., text message) being sent.

Figure 2:
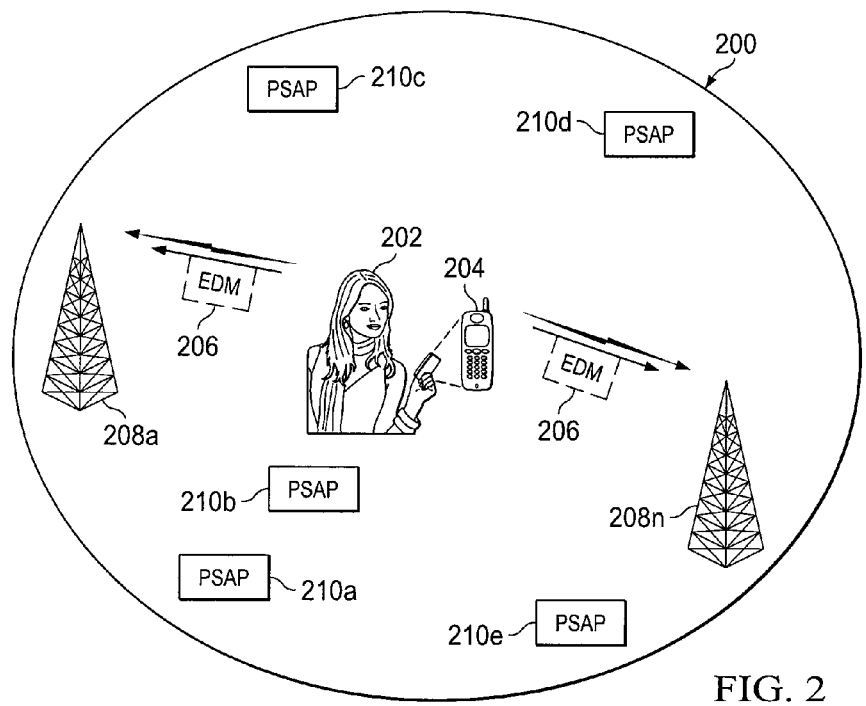
FIG. 2 is an illustration of a user of a wireless communications device operating in a cell site in which multiple PSAPs have different communications capabilities.

With regard to FIG. 2, a cell site 200 operates to handle wireless communications calls and messages communicated from users within the cell site 200. As shown, a user 202 using a wireless communications device 204 communicates an emergency data message 206 to any cell tower 208a-208n (collectively 208) or other wireless access point within the range of the wireless communications device 204.

Each of the PSAPs 210 may have different communications capabilities. For example, while all the PSAPs have voice capabilities, others may be more limited. Not all PSAPs will have text messaging capabilities, image viewing capabilities (e.g., photographs and videos), e-mail capabilities, and so forth. Depending on the type of emergency data message sent by the user 202 using the wireless communications device 204, which may have a wide variety of messaging capabilities, the emergency data message 206 may be communicated to a PSAP that is local to the user (e.g., within the cell site 200) and has communications capabilities that are compatible with the emergency data message (e.g., includes the ability to receive text messages through a mobile or other communications system, as understood in the art).

Figure 3:
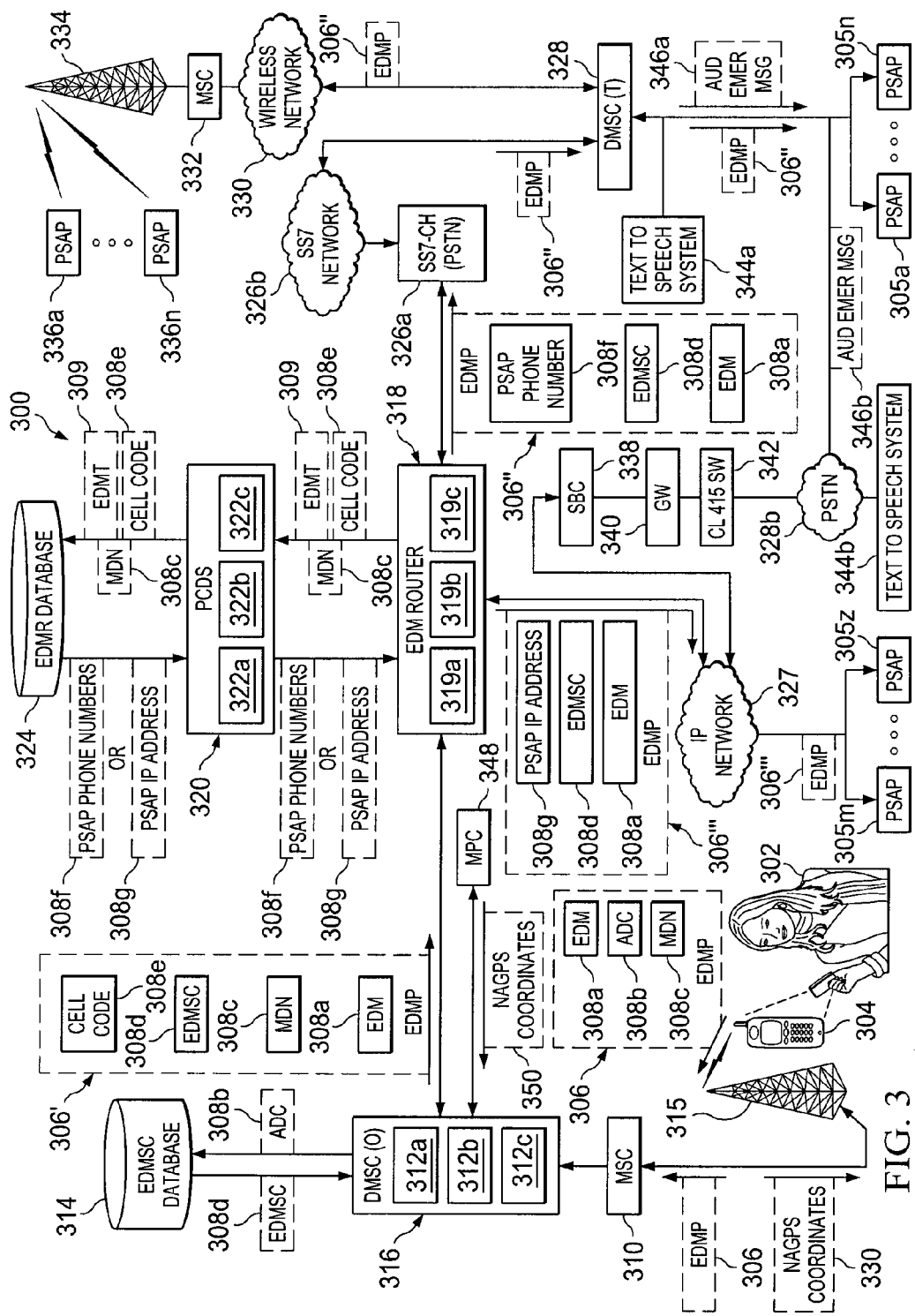
FIG. 3 is a block diagram of an illustrative communications network environment configured to receive and process emergency data messages to PSAPs local to users who sent the emergency data messages.

With regard to FIG. 3, a network environment 300 is configured to enable a user 302 using a wireless communications device 304 to communicate emergency data messages to public safety answering points 305a-305n and/or 305m-305z (collectively 305). The PSAPs 305a-305n are representative of PSAPs that are capable of receiving text messages and the PSAPs 305m-305z are PSAPs that are capable of receiving emergency data messages in the form of e-mail messages or other data format that is generally communicated over IP networks. It should be understood that the PSAPs 305a-305n and 305m-305z may overlap by one or more PSAP having multiple types of communications capabilities.

The user 302 may send an emergency data message package 306 by making an emergency data message request on the wireless communications device 304. In making the emergency data message request, the user may select a single button, multiple buttons, or use a menu system to cause the wireless communications device 304 to generate and communicate an emergency data message (EDM) 308a. In one embodiment, an emergency data message 308a may be a pre-established text message that includes contact information of the user, such as telephone number, home address, name, and other contact information, and insert geographic coordinates, such as GPS coordinates, that identify a location at which the user 302 is located at the time the user makes the emergency data message request. Alternatively, the emergency data message 308a may be a conventional data message (e.g., text message, instant message, or email) that a user initiates without a template or pre-established data being initially generated. The emergency data message package (EDMP) 306 may include the emergency data message 308a that may include up to 160 characters, in the case of an SMS message, abbreviated dialing code 308b, and mobile directory number (MDN) 308c.

The abbreviated dialing code 308b may be an alphanumeric code that is stored in the wireless communications device 304 and communicated with the emergency data message 308a to a mobile switching center (MSC) 310 for use in expediting or prioritizing the emergency data message package 306. The abbreviated dialing code 308b may be established by a service provider and/or manufacturer of the wireless communications device 304. The abbreviated dialing code 308b may essentially be any code, typically a ten digit code, that indicates that an emergency data message is being communicated from the wireless communications device 304. As an analogy, there are many different types of abbreviated dialing codes, including "411" for placing an information call to a service provider, "911" for placing an emergency telephone call, and so on. As an example, an abbreviated dialing code for indicating that an emergency data message is being communicated may be "0000000SOS." Alternatively, if different types of emergency data messages are available for selection using a menu system on the wireless communications device 304, then different abbreviated dialing codes may also be selectively communicated to represent the selected emergency data message that is being sent. For example, the abbreviated dialing codes may include "000000SOS1," "000000SOS2," "000000SOS3," and so on to indicate different types of emergencies. The different types of emergencies may include medical condition, automobile accident, fire, assault, or any other type of emergency data message that may be helpful to an operator at a PSAP for dispatching emergency personnel.

When the mobile switching center 310 receives the emergency data message 306, the mobile switching center 310 utilizes a process executed by a processing unit 312a that determines whether the emergency data message 308a is, in fact, an emergency data message or a standard data message, such as a text message that is often communicated between peers. The mobile switching center 310 may also include a memory 312b, which may include random access memory, disk drive memory, or other memory as understood in the art, that stores data and software and input/output unit 312c that communicates data over a network and with other local devices. In one embodiment, the memory 312b may store abbreviated dialing codes so as to be used by the processing unit 312a in determining whether the emergency data message 308a is, in fact, a priority message. In doing so, the processing unit 312a processes or parses the emergency data message package 306 to determine whether an abbreviated dialing code 308b is included or otherwise communicated with the emergency data message 308a. If such a determination is made that the emergency data message 308a is a priority message, then the processing unit 312a may communicate the abbreviated dialing code 308b to an emergency data message short code database (EDMSC DB) 314, which may be local or remote from the mobile switching center 310.

The emergency data message short code database 314 may include a listing (see TABLE I) of abbreviated dialing codes and short codes associated therewith so as to return an emergency data message short code 308d to the mobile switching center 310 that is indicative of the type of emergency data message 308a. The emergency data message short code 308d may be alphanumeric data and utilized by other nodes in the network environment 300 for prioritizing processing of the emergency data message package 306', which includes the emergency data message 308a (e.g., text), mobile directory number 308c, emergency data message short code 308d, and cell code 308e. The cell code or cell code identifier 308e is a data value associated with a cell of a mobile communications system and is typically determined by the mobile switching center 310 by determining to which cell tower the wireless communications device 304 is communicating. The emergency data message package 306' is communicated to an originating data message service controller 316, such as data message service controller (DMSC(O)), which may include SMS functionality in the case of routing short message service messages. THE DMSC(O) processes the emergency data message 306' for routing to emergency data message router 318.

TABLE I

| ADC | EDM Short Code | TYPE |
|---|---|---|
| SOS0 | EMERGENCY0 | Default |
| SOS1 | EMERGENCY1 | Medical |
| SOS2 | EMERGENCY2 | Automobile Accident |
| SOS3 | EMERGENCY3 | Fire |
| SOS4 | EMERGENCY4 | Assault |

The emergency data message router 318 may execute a process on processing unit 319a that processes the emergency data message package 306' to communicate the cell code 308e to a PSAP capabilities defining system (PCDS) 320. In an alternative embodiment, the emergency data message router 318 and PCDS 320 are configured on a single computing system. The processing unit 319a may include one or more processors. Other computing and communications components, such as a memory 319b for storing data and software, input/output (I/O) unit 319c for communicating data over a network, may be included in the emergency data message router 318, as understood in the art. The PCDS 320 may execute a process on a processing unit 322a for determining PSAPs local to the user 302 and communications capabilities of PSAPs that are determined to be local to the user 302. The PCDS 320 may also include a memory 322b for storing memory and software and input/output unit 322c for communicating data over a network and/or with the EDM router 318.

In determining local PSAPs, the PCDS 320 may receive the mobile directory number 308c and cell code 308e and use a three-digit exchange code or portion of the MDN 308c and/or cell code 308e to determine whether there is a PSAP local to the exchange code of the wireless communications device 304 by matching the three-digit exchange code of the MDN 308c and exchange code associated with the PSAPs. However, because the wireless communications device 304 is mobile and may be utilized outside the exchange area in which the wireless communications device 304 is initially registered, a PCDS 320 may or may not use the MDN 308c in determining a local PSAP to the user 302. For example, if the exchange code digits of the MDN 308c are foreign to an area in which the wireless communications device 304 is operating, then the PCDS 320 may be limited to using the cell code 308e to determine PSAPs that are local to the user 302. A combination of both the cell code 308e and exchange code may be used to determine local PSAPs.

An emergency data message router database 324 may be in communication with the PCDS 320 to enable the PCDS 320 to look up PSAPs that are (i) local to the user 302 and (ii) have particular communications capabilities. The emergency data message router database 324 may be local to or remotely located from the PCDS 320. The communications capabilities may include the ability to receive text messages, instant messages, e-mails, photo messages, or video messages, as understood in the art. In determining the communications capabilities, the PCDS 320 and/or EDMR DB 324 may determine an address associated with a local PSAP, and the communications capabilities may be identified by the type of address (e.g., telephone number or IP address) or position of the address within the EDMR DB 324. With each of these communications capabilities, the PSAPs have access to communications network(s) that are capable of communicating compatible emergency data messages of those types. It should be understood that the PCDS 320 and process being executed by the processing unit 322a may identify the type of emergency data message 308a that is being communicated and determine which PSAP local to the user 302 is capable of receiving that type of emergency data message. For example, if the emergency data message 308a is a text message, then a PSAP that is both local to the user and has capabilities of receiving emergency text messages may be determined to be most compatible with the emergency data message that is being communicated to the PSAP.

Although a PSAP that is closest to the user 302 may be considered ideal from an emergency personnel deployment perspective, because emergency data messages are being communicated by the user 302, and many PSAPs are not equipped to handle certain types of communications, the PCDS 320 may determine whether any PSAPs local to the user 302 are compatible with the emergency data message 306' that is being communicated before selecting the PSAP to route the emergency data message 308a. In other words, an emergency data message sent in its original form may be best to provide to a PSAP in that same form to avoid loss of data, corruption of the data, or misinterpretation by a PSAP operator.

To determine whether a PSAP has compatible communications, the emergency data message router 318 may determine, by examining a packet header or other data field(s), generate, and communicate an emergency data message type (EDMT) 309, which may be an alphanumeric value and is indicative of the type of emergency data being communicated (e.g., text, image, instant message, email). The PCDS 320 may use and/or communicate the EDMT 309 to the emergency data message router database 324 to identify any PSAPs local to the user that have communications capabilities that are compatible with the emergency data message type. If, for example, it is determined by the PCDS 320 that there are no PSAPs local to the user 302 that are compatible with receiving text messages based on the EDMT 309, then the PCDS 320 may determine that an emergency text message may be communicated to a local PSAP by sending the PSAP to a text-to-speech translator for converting the text-to-speech for audible communication to the local PSAP. The emergency data message router database 324, in response to locating a local PSAP with the most compatible communications capabilities, may return a PSAP telephone number 308f or PSAP IP address 308g, depending on the communications network that is available to communicate the type of emergency data message received from the wireless communications device 304. The PSAP telephone number 308f may be used for a text message or image message to be communicated to the PSAP and the PSAP IP address 308g may be used for communicating an email to the PSAP, for example.

Depending on whether the selected PSAP is to be communicated via an SS7 clearinghouse (CH) 326a and SS7 network 326b, IP network 327, wireless communications network 330 (e.g., mobile network), or any other communications system or network, the emergency data message router 318 may communicate the emergency data message 308a to the telephone number or address of the selected PSAP. If the emergency data message 306" is to be communicated over the SS7-CH 326a and network 326b, then the PSAP telephone number 308f is communicated with the emergency data message short code 308d and emergency data message 308a to the PSAP 305n that is determined to be local to the user 302 and capable of receiving the emergency data message 308a having the appropriate communications network connection and software interface for displaying the emergency data message 308a.

The emergency data message package 306" is communicated via a terminating data message service controller (DMSC(T)) 328 for routing to the appropriate PSAP via the PSTN 329a or wireless communications network 330. If the emergency data message 308a is a text message or image, then the DMSC(T) 328 may route the EDMP 306" via the wireless communications network 330, including a mobile switching center 332 and base station 334, to one of the PSAPs 336a-336n (collectively 336). The PSAPs 336 may be limited to wireless or mobile communications or have multiple communications capabilities. It should be understood that although the PSAPs 305a-305n, 305m-305z, and 336a-336n are shown to be in communication with different communications networks, that each may be in communication with one or more of the communications network and have separate devices that communicate with respective communications networks or have a device that is capable of receiving or consolidating emergency messages from different communications networks.

If, alternatively, the emergency data message 308a is an email rather than a text or photo message, then the PCDS 320 determines a PSAP local to the user 302 that is configured to receive emails and routes the emergency data message package 306''' via the IP network 327 to a PSAP 305m that is local to the user 302 and configured to receive and display emails. In determining the appropriate PSAP, the PCDS 320 accesses the emergency data message router database 324 to look-up a local PSAP with email communications capabilities and receives the PSAP IP address 308g from the emergency data message router database 324 for communicating the emergency data message package 306''' to the PSAP IP address 308g at the PSAP, in this case PSAP 308m.

A communication link between the IP network 327 and PSTN 329b by including a session border controller 338, gateway 340, and class 4/5 switch 342, as understood in the art, so that emergency data messages may be routed via the IP network 327 for distribution to a PSAP that is limited to communicating via the PSTN 329b, as may be found in rural areas of the country. Because different portions of the PSTN 329b may be configured to handle IP messaging from the IP network 327, the PSTN 329b is shown separately from the PSTN 329a. Because the emergency data message 308a includes text, if the emergency data message 308a is communicated over the PSTN 329a or the IP network 327 and PSTN 329b, the text is converted by a text-to-speech system 344a or 344b, respectively, to generate an audible emergency message 346a or 346b, respectively. The decision and ability to route the emergency data message 308a via the SS7 network 326b or IP network 327 may be dependent upon the configuration of the EDM router 318. However, because the emergency data message 308a is to be expedited to a PSAP, other factors, such as network congestion, selected PSAP communications capabilities, or other factors, may be used by the EDM router 318 to select which network path to communicate the emergency data message 308a.

More specifically, the emergency data message router database 324 may include a database or table that stores and manages PSAP cell codes, capabilities, and network addresses so that the PCDS 320 may select an appropriate PSAP to communicate the emergency data message based on a number of factors, including distance from the user, type of emergency data message, network connection, which may be indicated by whether a network address is available, and so forth. An illustrative listing of a table that may be managed and operated by the emergency data message router database 324 is shown in TABLE II below.

TABLE II

| PSAP | PSAP Cell Code | Exchange Codes | Capabilities | Network Addresses | | |
|---|---|---|---|---|---|---|
| | | | | Voice (PSTN) | Text/Image (Mobile Network) | Email (IP Address) |
| Easton | 3719 | 405 | Voice | 972-405-1234 | — | — |
| Weston | 3720 | 826, 259 | Voice, Text | 972-826-1234 | 972-259-9876 | — |
| Central 1 | 3721, 3729 | 408 | Voice | 214-408-9876 | — | — |
| Central 2 | 3721, 3730 | 528, 526 | Voice, Text | 214-528-1234 | 214-526-5555 | — |
| Central 3 | 3721, 3729 | 528, 259 | Voice, Text, Image, Email | 214-528-5678 | 214-259-5555 | 127.37.17.38 |
| South 1 | 3722, 3741 | 699 | Voice | 817-699-1234 | — | — |
| South 2 | 3722, 3733 | 347, 283 | Voice, Text | 817-347-1234 | 817-283-5555 | — |
| North | 3723 | 277, 623 | Voice, Text, Image, Email | 972-277-1234 | 972-623-5555 | 128.94.1.23 |

The EDM router 318, PCDS 320, EDMR DB 324 or combination thereof may route or reformat, re-address, and/or route the emergency data message 308a. If a determination is made that a PSAP does not have a compatible communications capability as an emergency data message, then the emergency content of the emergency data message may be reformatted, re-addressed, and re-routed. If the emergency data message type matches the communications capabilities of a selected local PSAP, then the emergency data message 308a may be routed accordingly.

As an example, if the emergency data message type of the emergency data message 308a is a text message being communicated using SMS and the communications capabilities of a local PSAP includes text messaging, then the emergency data message package 306" is routed to the SS7-CH 326a for delivery to a wireless device at one of the PSAPs 305a-305n. If the communications capabilities of a local PSAP includes instant messaging without text messaging, then the emergency data message 308a is reformatted and re-addressed to comply with instant message protocols and sent to an instant message client at the PSAP via either the SS7-CH 326a and network 326b or IP network 327, depending on a network address (e.g., telephone number or IP address) of the PSAP. If the communications capabilities of a local PSAP includes email, then the emergency data message 308a may be reformatted and re-addressed to comply with email protocols and sent to a PSAP email client with a priority indication, either the emergency data message short code 308d or otherwise. If the communications capabilities of a local PSAP is limited to voice only, then the emergency data message 308a is communicated to the text-to-speech system 344, as understood in the art, via the DMSC(T) 328 for synthesizing speech of content of the emergency data message 308a and communication to the local PSAP.

Figure 4:
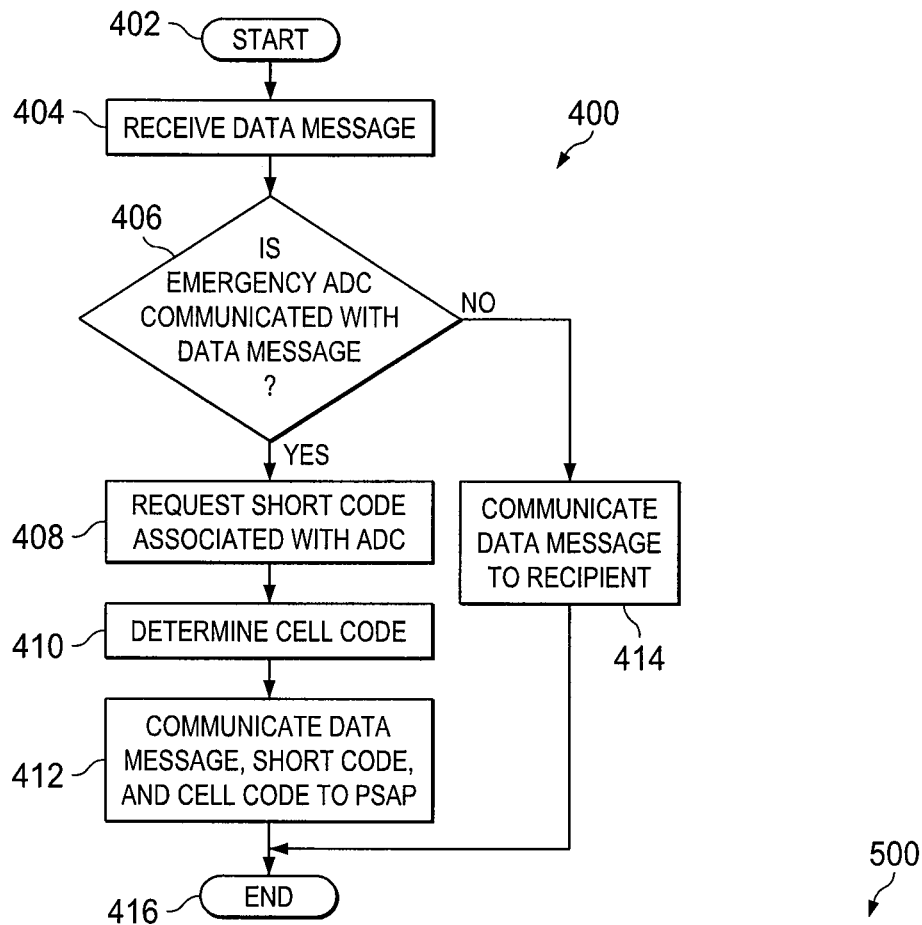
FIG. 4 is a flow diagram of an illustrative process for a mobile switching center to receive and process emergency data messages.

With regard to FIG. 4, an illustrative process 400 of a mobile switching center identifying an emergency data message is provided. The process 400 starts at step 402. At step 404, a data message is received. The data message may be a text message, instant message, email, or any other data message that may be communicated from a wireless communications device. At step 406, a determination may be made as to whether an emergency abbreviated dialing code is communicated with the data message. If so, then at step 408, a short code associated with the emergency abbreviated dialing code may be requested. In addition, a determination of a cell code in which the wireless communications device that communicated the emergency data message may be determined. The emergency data message, short code, and cell code may be communicated to a PSAP at step 412. In communicating to the PSAP, the information, including the emergency data message, short code, and cell code, is communicated via a communications network to a network address for determining a PSAP local to a user who sent the emergency data message. If, at step 406, an emergency abbreviated dialing code is not communicated with the data message, then at step 414, the data message is communicated to a recipient, as understood in the art. The process ends at step 416.

Figure 5:
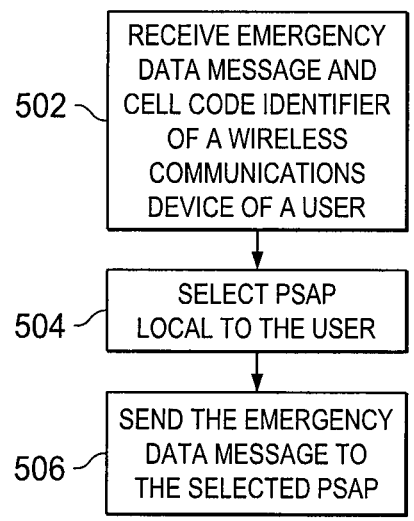
FIG. 5 is a flow diagram of an illustrative process for selecting a PSAP local to a user who sent an emergency data message.

With regard to FIG. 5, an illustrative process 500 may be performed by a PSAP capabilities defining system, which may be in communication with an emergency data message router. At step 502, an emergency data message and cell code identifier of a wireless communications device of a user may be received. In addition, a mobile directory number may also be received. At step 504, a PSAP local to the user may be selected. In selecting the local PSAP, a determination of the communications capabilities at one or more PSAPs local to the user may be determined using the cell code identifier and/or mobile directory number so as to determine which PSAP is nearest the user that has communications capabilities that are most compatible with the format of the emergency data message. At step 506, the emergency data message may be sent to the selected PSAP.

Figure 6:
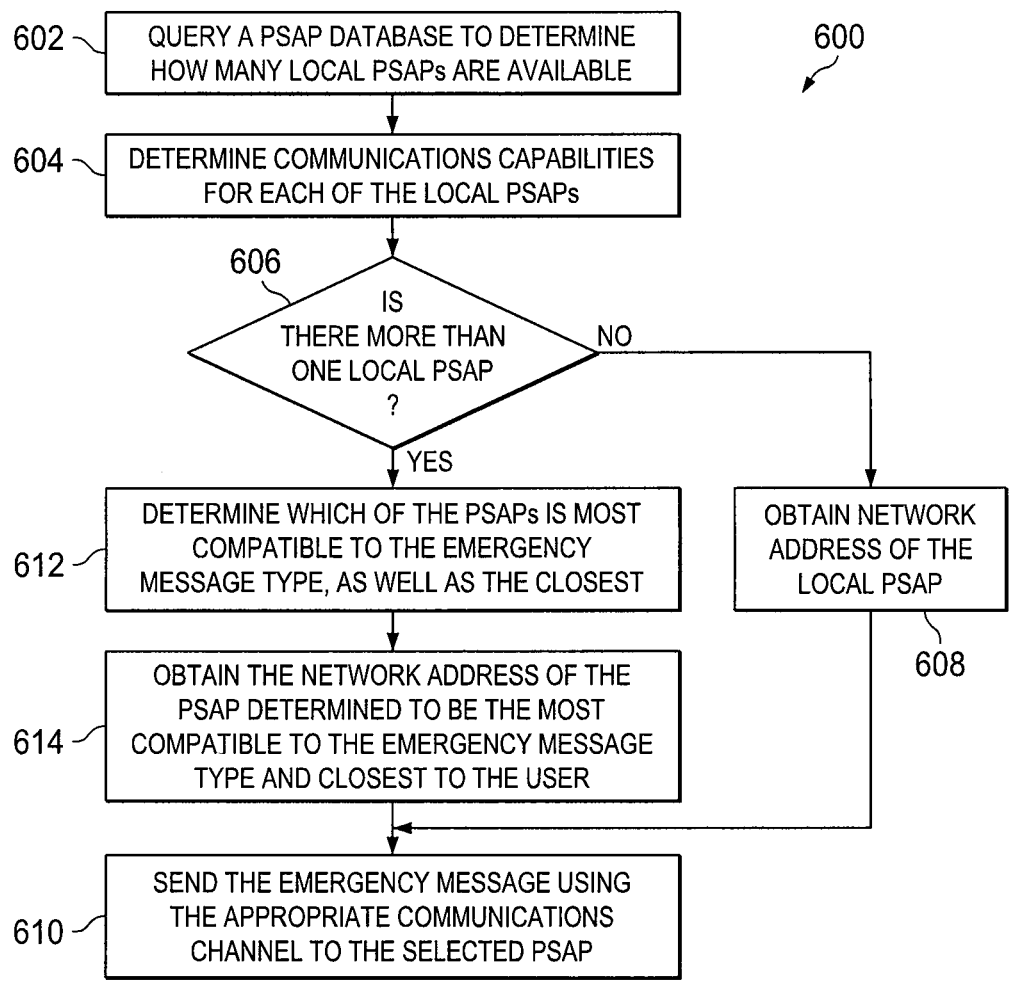
FIG. 6 is a flow diagram of a more detailed illustrative process for determining a PSAP local to a user who sent an emergency data message based on PSAP distance from the user and communications capabilities of the local PSAPs.

With regard to FIG. 6, a more detailed process 600 for determining to which PSAP to communicate an emergency data message is provided. At step 602, a query of a PSAP database may be made to determine how many local PSAPs are available with respect to a user who communicates an emergency data message may be made. At step 604, a determination as to communications capabilities of each of the local PSAPs may be made. The determination may include determining the types of data messages that may be received by each of the PSAPs and communications networks to which the PSAPs are in communication. At step 606, a determination may be made as to whether there are more than one local PSAP. If not, then at step 608, a network address, such as a telephone number, IP address, or otherwise, of the local PSAP may be obtained. At step 610, the emergency data message may be sent to the PSAP using the appropriate communications channel. For example, in the event that the emergency data message is a text message, then if the network address of the local PSAP is a telephone number that is operating on a mobile communications system, then the emergency data message may be communicated over the mobile communications system to the PSAP.

If at step 606, a determination is made that more than one local PSAP is available, then at step 612, a determination as to which of the PSAPs the emergency data message type is most compatible and closest to the user who sent the emergency data message. At step 614, a network address of the PSAP determined to be the most compatible to the emergency data message type and closest to the user may be obtained. Although it may be desirable to identify the closest PSAP to the user and send the emergency data message to that PSAP, if the PSAP does not have communications capabilities to receive the emergency data message, then it may be as or more beneficial to find a PSAP that is further from the user and has the communications capabilities that accommodates the type of emergency data message that was sent so that an operator at the PSAP can handle the emergency request more efficiently. For example, if a PSAP is close to a user, but does not have text messaging capabilities and another PSAP which may be a few miles farther than the user but does have text messaging capabilities, then the emergency data message may be better communicated to the PSAP farther away even though the text message may be communicated to a text-to-speech system that may convert the information in the emergency text message for play to an operator at the closer PSAP. If no local PSAPs have text messaging capabilities, an emergency text message may be communicated to a text-to-speech converter so that the synthesized speech can be routed to a PSAP closest to the user. The process 600 continues at step 610, where the emergency data message is communicated to the selected PSAP.

Figure 7:
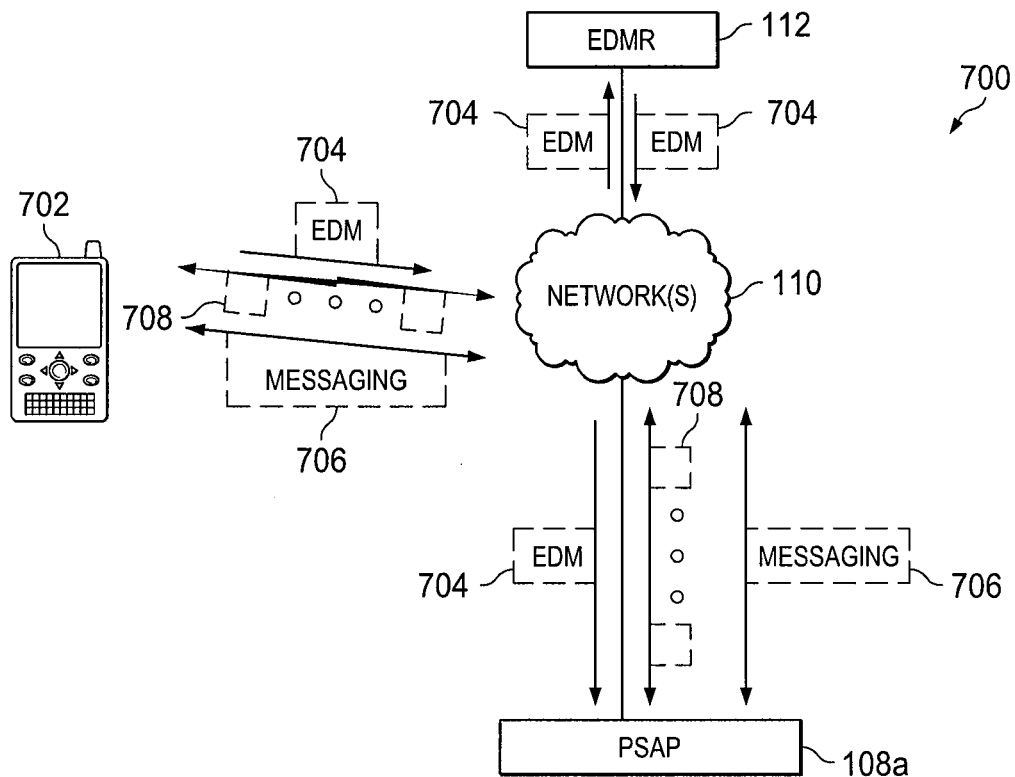
FIG. 7 is a block diagram of an illustrative network environment that is configured to handle emergency image messaging and provide communications between a wireless communications device and a PSAP.

FIG. 7 is a block diagram of an illustrative network environment 700 that is configured to handle emergency image messaging and provide communications between a wireless communications device 702 and a PSAP 108a via network(s) 110. The wireless communications device 702 may be used by a user to communicate an emergency data message 704 that includes an image (not shown). The image may be a photograph, video, or streaming video. In one embodiment, the photograph or video are attachments. Alternatively, the photograph or video may be embedded in the emergency data message 704. In communicating the emergency data message 704, the user may address the emergency data message 704 to a centralized network location, which may be the network address of the emergency data message router 112. The emergency data message router 112 may identify a PSAP local to the user and having imaging capabilities. Once identified, the emergency data message 704 may be routed to the PSAP, in this case PSAP 108a.

In addition to routing the emergency data message 704 to the PSAP 108a, the PSAP 108a may be configured to establish a communications link with the wireless communications device 702. The communications link may provide for messaging 706, which may include text messaging, instant messaging, or any other type of messaging utilizing data packets 708 for communicating voice or data, as understood in the art. In one embodiment, the communications link is a simultaneous voice communication link. Alternatively, the communications link may be a simultaneous messaging link, especially if streaming video is being communicated from the wireless communications device. A text messaging communication, such as an instant messaging session, may be safest for the user if in a mode where he or she is hiding from someone and making noise would cause the user to be discovered. Alternatively, if the user is in a situation where he or she is unable to type, such as being in a fire, then a voice communication may be better. Whichever communication is to be established, the wireless communications device has to have those communications capabilities.

Figure 8:
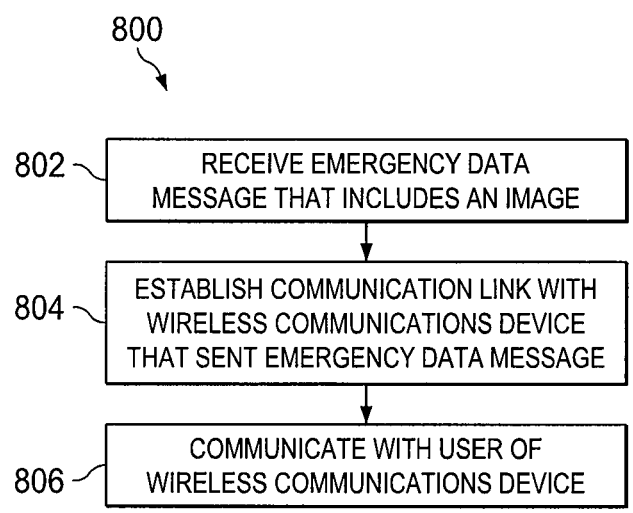
FIG. 8 is a flow diagram of an illustrative process for establishing communications between a wireless communications device and a PSAP.

FIG. 8 is a flow diagram of an illustrative process 800 for establishing communications between a wireless communications device and a PSAP. At step 802, an emergency data message that includes an image is received. In one embodiment, the emergency data message may be received at a network location, such as an emergency data message router. Alternatively the emergency data message may be received at a PSAP. At step 804, a communications link may be established with the wireless communications device that sent the emergency data message. The communications link between the wireless communications device and PSAP may be established by the emergency data message router. Alternatively, the PSAP may establish the communications link. If the PSAP establishes the communications link, then the communications link may be managed by the emergency data message router so that communications between the user and PSAP may be prioritized over the network(s).

Figure 9:
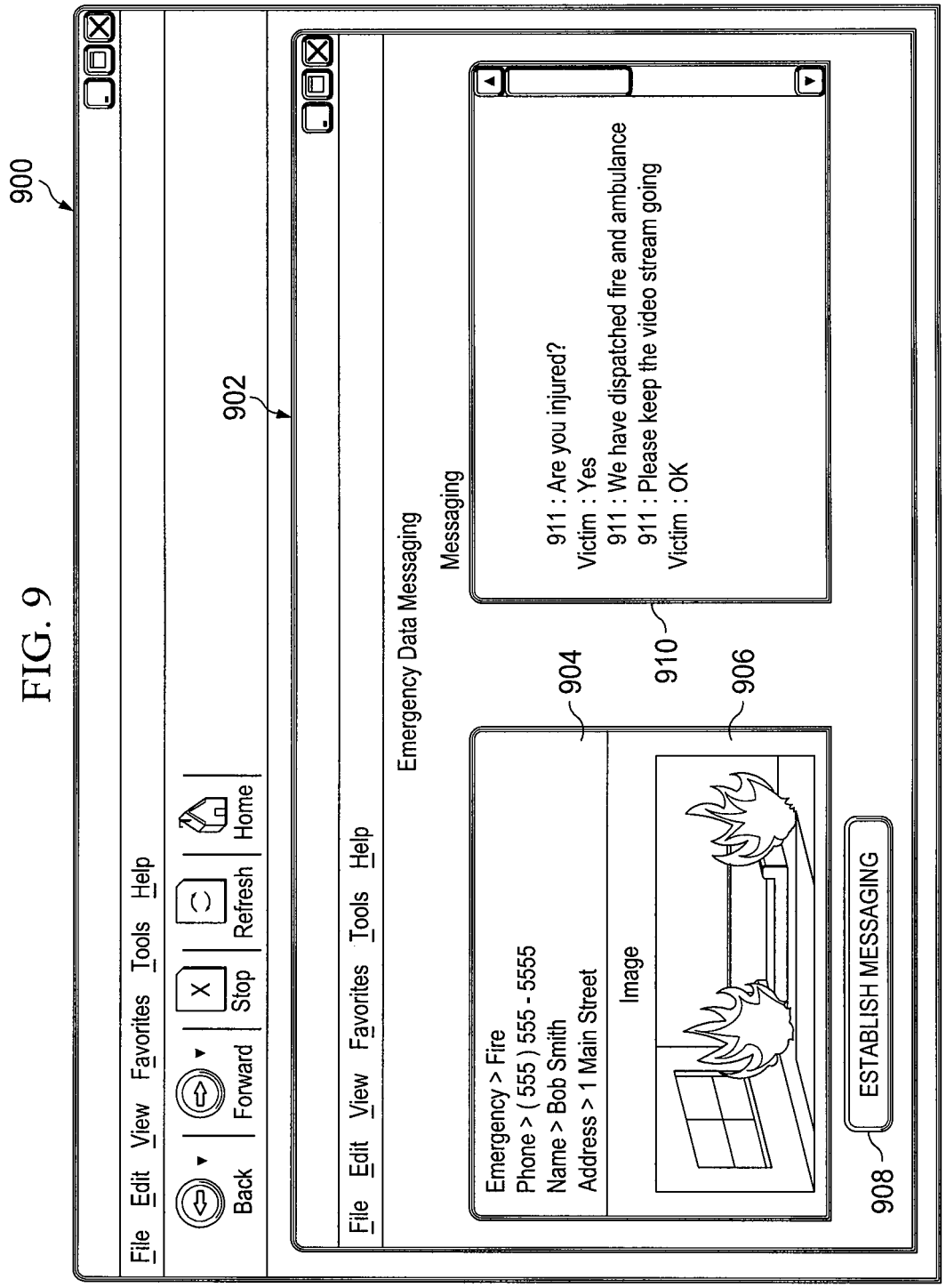
FIG. 9 is an illustration of an illustrative graphical user interface at a PSAP to initiate communications with a wireless communications device.

FIG. 9 is an illustration of an illustrative graphical user interface (GUI) 900 at a PSAP. The GUI 900 may be a browser, such as Microsoft Internet Explorer®, as understood in the art. An application window 902 may be configured to display emergency data messages that include text and image data. The text data may be displayed in the application window 902 in a text portion 904 and the image data may be displayed in an image portion 906. As shown in the image, a fire is burning in the home of the user.

Below the image portion 906 is a soft-button 908 that enables an operator at the PSAP to request to establish messaging 908. The operator may select the soft-button 908 to cause messaging, either text, email, or instant messaging, to occur between the operator and the user of the wireless communications device that was used to send the emergency data message. In one embodiment, in response to the operator selecting the soft-button 908, a selection window for the type of messaging may be displayed and the operator may select the type of messaging to initiate based on the perceived circumstances in which he or she understands the user/victim to be. A messaging window 910 may provide for messaging to be displayed for the operator to communicate with the user/victim. If the image being displayed in the image portion 906 is a streaming video, then the messaging may be performed simultaneously while receiving the streaming video, which, as understood in the art, can be performed without much difficulty due to low bandwidth requirements for the messaging as compared to the video. The PSAP may establish the messaging on a priority basis by communicating through an emergency data message router or other router that is configured to apply a short code to messages communicated to the wireless communications device of the user/victim to prioritize messaging with the user/victim.

Although the principles of the present have primarily been described with regard to wireless communications devices, it should be understood that wired communications devices, including wired/wireless computers, may be adapted to include emergency messaging, as described herein. One or more buttons or other initiation devices may be provided on the wired communications devices to generate and communicate an emergency data message to a network location for routing to a PSAP local to the user. In adapting the wired communications devices, software may be included in the devices to generate and communicate an emergency data message (e.g., text message or email) using a communications protocol that is capable of being communicated over the communications network (e.g., public switched telephone network, cable network, Internet), as understood in the art. Information specific to the user, location of the user, or otherwise may be included in the emergency data message. For example, name, address, number of people in residence, photograph, medical conditions, or any other information may be pre-established for retrieval and inclusion in the emergency data message, thereby providing information to an operator at a PSAP to provide emergency personnel, such as police, firemen, or medical personnel.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

We claim:

1. A method for routing emergency image messages to a public safety answering point (PSAP), said method comprising:
   receiving an emergency data message from a wireless communications device;
   identifying that the emergency data message includes an image;
   generating an emergency data type indicating that the emergency data message includes an image;
   determining a location of the wireless communications device used to send the emergency data message;
   communicating the emergency data type to an emergency data message router database to identify one or more PSAPs local to the wireless communications device based upon the determined location of the wireless communications device and determine at least one PSAP capable of receiving the emergency data message that includes an image; and
   routing the emergency data message that includes an image to the at least one PSAP local to the wireless communications device and capable of receiving emergency data messages that includes an image.

2. The method according to claim 1, wherein identifying that the emergency data message includes an image includes identifying that the emergency message includes a photograph.

3. The method according to claim 2, wherein identifying that the emergency data message includes an image includes identifying that the emergency data message includes a photograph attachment.

4. The method according to claim 1, wherein identifying that the emergency data message includes an image includes identifying that the emergency data message includes a video.

5. The method according to claim 1, wherein identifying that the emergency data message includes an image includes identifying that the emergency data message includes streaming video.

6. The method according to claim 5, further comprising establishing a bi-directional communications path between the at least one PSAP and the wireless communications device while maintaining the streaming video.

7. The method according to claim 6, wherein establishing the bi-directional communications path includes establishing a voice communications path.

8. The method according to claim 6, wherein establishing the bi-directional communications path includes establishing a data communications path.

9. The method according to claim 1, wherein the at least one PSAP further comprises a PSAP that is local and closest to the wireless communications device and capable of receiving emergency data messages that include an image.

10. The method according to claim 1, wherein the at least one PSAP further comprises a PSAP selected based on a cell code, mobile directory number, and emergency data message type.

11. A system for routing an emergency data message to a public safety answering point (PSAP), said system comprising:
a memory;
an input/output (I/O) unit;
a processing unit in communication with said memory and I/O unit, and configured to:
receive the emergency data message from a wireless communications device;
identify that the emergency data message includes an image;
generate an emergency data type indicating that the emergency data message includes an image;
determine a location of the wireless communications device used to send the emergency data message;
communicate the emergency data type to an emergency data message router database to identify one or more PSAPs local to the wireless communications device based upon the determined location of the wireless communications device and determine at least one PSAP capable of receiving the emergency data message that includes an image; and
route the emergency data message that includes an image to the at least one PSAP local to the wireless communications device and capable of receiving emergency data messages that include an image.

12. The system according to claim 11, wherein said processing unit is configured to identify that the emergency data message includes a photograph.

13. The system according to claim 12, wherein said processing unit is configured to identifying that the emergency data message includes an image includes identifying that the emergency data message includes a photograph attachment.

14. The system according to claim 13, wherein said processing unit is configured to identify that the emergency data message includes a video.

15. The system according to claim 13, wherein said processing unit is further configured to identify that the emergency data message includes streaming video.

16. The system according to claim 11, wherein said processing unit is further configured to establish a bi-directional communications path between the at least one PSAP and the wireless communications device while maintaining the streaming video.

17. The system according to claim 16, wherein said processing unit, in establishing the bi-directional communications path is configured to establish a voice communications path.

18. The system according to claim 16, wherein said processing unit, in establishing the bi-directional communications path is configured to establish a data communications path.

19. The system according to claim 11, wherein said processing unit is further configured to select the at least one PSAP based upon a determination of the PSAP that is local and closest to the wireless communications device and capable of receiving emergency data messages that include an image.

20. The system according to claim 11, wherein said processing unit is configured to select the at least one PSAP based upon the determined location of the wireless communications device and further based upon on a cell code, mobile directory number, and emergency data message type.

* * * * *